US012116141B2

(12) United States Patent
Baker et al.

(10) Patent No.: US 12,116,141 B2
(45) Date of Patent: Oct. 15, 2024

(54) AIRCRAFT EMERGENCY POWER UNIT WITH BATTERY POWERED SUBSYSTEM

(71) Applicant: Eaton Intelligent Power Limited, Dublin (IE)

(72) Inventors: Jeffrey A. Baker, Lake City, MI (US); Mario F. Cruz, Huntington Beach, CA (US); David R. Smit, Moline, MI (US); Derek Paul Dougherty, Fruitport, MI (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 492 days.

(21) Appl. No.: 17/545,566

(22) Filed: Dec. 8, 2021

(65) Prior Publication Data

US 2022/0185496 A1   Jun. 16, 2022

Related U.S. Application Data

(60) Provisional application No. 63/124,222, filed on Dec. 11, 2020.

(51) Int. Cl.
  *B64D 41/00*   (2006.01)
(52) U.S. Cl.
  CPC .......... *B64D 41/00* (2013.01); *B64D 2201/00* (2013.01); *B64D 2221/00* (2013.01)
(58) Field of Classification Search
  CPC .. B64D 41/00; B64D 41/007; B64D 2221/00; F02C 7/277; F02C 7/32; F05D 2220/50
  See application file for complete search history.

(56) References Cited

U.S. PATENT DOCUMENTS

| 4,033,115 | A | 7/1977 | Baits |
| 4,934,136 | A | 6/1990 | Weigand et al. |
| 6,244,036 | B1 | 6/2001 | Christie et al. |

FOREIGN PATENT DOCUMENTS

| KR | 10-2006-0004806 A | 1/2006 |
| KR | 10-1362910 B1 | 2/2014 |

OTHER PUBLICATIONS

Extended European Search Report for Application No. 21213797.0 mailed May 3, 2022.

(Continued)

*Primary Examiner* — Christopher P Ellis
*Assistant Examiner* — Terri L Filosi
(74) *Attorney, Agent, or Firm* — Merchant & Gould P.C.

(57) ABSTRACT

An aircraft emergency power unit (EPU) includes a battery powered subsystem that replaces toxic hydrazine fuel use. The battery of the battery powered subsystem is utilized to supply power to an aircraft electrical system in the event of a failure of the EPU turbine-powered generator. The battery of the battery powered subsystem is also utilized to supply power to an electric hydraulic motor pump in the event of a failure of the EPU turbine-powered hydraulic pump (or to augment the output of the EPU-turbine-powered hydraulic pump). The battery of the battery powered subsystem is capable of simultaneously powering the electrical system and the electric hydraulic motor pump or of powering either one of the electrical system and electric hydraulic motor pump independently based upon aircraft fault conditions. Intermittent operation of the electrical system and/or the electric hydraulic motor pump in an intermittent fashion on an as-needed basis is also possible.

20 Claims, 4 Drawing Sheets

(56) References Cited

OTHER PUBLICATIONS

Allen et al., "Emergency Power for the F-16 Aircraft," ASME 1983 International Gas Turbine Conference and Exhibit, 5 pages (1983).
Cenciotti, "Hydrazine: A Significant Hazard Each Time an F-16 Crashes (or Fires Up the Emergency Power Unit)," The Aviationist, 10 pages (May 19, 2019).
Cha et al., "Advanced Emergency Power System Using Thermal Battery for Future Aircraft," 4th International Energy Conversion Engineering Conference and Exhibit (IECEC), 11 pages (2006).
Korean Aerospace Industries T-50, Publication No. CFS100-2, Eaton Corporation, 2 pages (Jun. 2010).
Why is Hydrazine used to power the F-16's EPU?, Aviation Stack Exchange, https://aviation.stackexchange.com/questions/23417/why-is-hydrazine-used-to-pwer-the-f-16s-epu/23421, 4 pages (Downloaded Nov. 4, 2020).

AIRCRAFT EMERGENCY POWER UNIT WITH BATTERY POWERED SUBSYSTEM

TECHNICAL FIELD

The present disclosure is directed to an aircraft emergency power unit and, more specifically, an aircraft emergency power unit with a battery powered subsystem.

BACKGROUND

The F-16 aircraft is a single-engine supersonic multirole fighter aircraft which was developed and is currently used by the United States Air Force. The current emergency power system for the F-16 includes a turbine connected to a reduction gearbox that further drives both a hydraulic pump and a generator directing essential power back into the aircraft. The pneumatic power for the turbine is either provided by engine bleed air or vaporized water (steam) and ammonia. The steam and ammonia are byproducts of the chemical compound hydrazine. Upon initiation of the emergency power system, bleed air gasses are the main source of power, however, in the event that the bleed air pressure is insufficient due to, for example, a low throttle setting, a high altitude, engine problem, etc., hydrazine fuel is introduced to the catalyst as a means to augment the bleed air for required operating pressure or to become the primary means of turbine pneumatic power, e.g., it is the Primary Recovery System (PRS). Activation of the power system is designed to provide pilots with the time needed to land the aircraft safely.

The use of hydrazine fuel as an onboard source of emergency power on the F-16 was a reasonable choice during the initial design of the aircraft in the 1970s, however, its use presents challenges to both the pilot and any ground recovery crews. More specifically, hydrazine is a highly toxic chemical whose vapors can cause irritation to the eyes and respiratory tract. Further, short term exposure to hydrazine vapors may cause tremors and prolonged exposure may cause damage to the liver and kidneys, possibly convulsions or death.

SUMMARY

This Summary is provided to introduce a selection of concepts in simplified form that are further described in the Detailed Description. This Summary is not intended to identify key features or essential features of the claimed subject matter, nor is it intended to be used to limit the scope of the claimed subject matter. Additional aspects, features and/or advantages of the concepts can be appreciated from the Detailed Description provided below.

The present disclosure is directed to an aircraft emergency power unit (EPU) includes a battery powered subsystem that replaces toxic hydrazine fuel use. The battery of the battery powered subsystem is utilized to supply power to an aircraft electrical system in the event of a failure of the EPU turbine-powered generator. The battery of the battery powered subsystem is also utilized to supply power to an electric hydraulic motor pump in the event of a failure of the EPU turbine-powered hydraulic pump (or to augment the output of the EPU-turbine-powered hydraulic pump). The battery of the battery powered subsystem is capable of simultaneously powering the electrical system and the electric hydraulic motor pump or of powering either one of the electrical system and electric hydraulic motor pump independently based upon aircraft fault conditions. Intermittent operation of the electrical system and/or the electric hydraulic motor pump in an intermittent fashion on an as-needed basis is also possible.

A first aspect of the present disclosure is directed to an emergency aircraft power unit (EPU). The aircraft EPU includes a bleed-air powered turbine, a hydraulic pump powered by the turbine and a generator powered by the turbine. The aircraft EPU additionally includes a battery, a hydraulic motor pump powered by the battery and an inverter. The hydraulic pump has an operational mode during which hydraulic power is supplied to a hydraulic system of an aircraft at a level sufficient to support hydraulic operation of the aircraft and a fault mode during which the hydraulic pump is supplying insufficient to the hydraulic system. Similarly, the generator has an operational mode during which electrical power is supplied to the electrical system of the aircraft at a level to support electrical operation of the aircraft and a fault mode during which the generator is supplying insufficient electrical power to the electrical system. The hydraulic motor pump is activated to supply hydraulic power to the aircraft hydraulic system responsive to the occurrence of the fault of the hydraulic pump. The inverter is activated to receive DC power from the battery and supply electrical power to the electrical system of the aircraft responsive to the occurrence of the fault mode of the generator.

In certain embodiments, the bleed air valve that supplies bleed air to the turbine of the aircraft is opened to supply air responsive to a user-input or responsive to both a primary and a secondary generator of the aircraft failing. In certain embodiments, activation of the hydraulic motor pump is independent of activation of the inverter. In certain embodiments the fault mode of the hydraulic pump is intermittent and the activation/deactivation of the hydraulic motor pump is correspondingly intermittent. In certain embodiments, the fault mode of the generator is intermittent and the activation/deactivation of the inverter to deliver electrical power is correspondingly intermittent. In certain embodiments, both the hydraulic motor pump and the inverter are active simultaneously. In certain embodiments, the activated hydraulic motor pump augments the hydraulic power supplied by the hydraulic pump. In certain embodiments, the activated hydraulic motor pump supplies all hydraulic power to the hydraulic system of the aircraft.

Still another aspect of the present disclosure is directed to a method of operating an aircraft emergency power unit (EPU). The method includes opening a bleed air valve to supply bleed air to a turbine of an aircraft with the turbine powering a hydraulic pump to supply hydraulic power to an aircraft hydraulic system. The method further includes determining that a speed of the turbine is not at a desired operating level and, based on the speed of the turbine not being at the desired operating level, activating a hydraulic motor pump with a battery to supply hydraulic power not being supplied by the hydraulic pump. Further, based on the speed of the turbine being at the desired operating level, the method includes deactivating the battery powered hydraulic motor pump.

In certain embodiments, the turbine additionally powers a generator to supply electrical power to an aircraft electrical system and the method further comprises determining that the generator is not providing sufficient electrical power to an electrical system, activating an inverter to receive DC power from the battery, and supplying electrical power to the aircraft electrical system via the inverter. In certain embodiments, opening the bleed air valve occurs responsive to a user-input or to an operational fault of the aircraft. In certain embodiments, the operational fault comprises a failure of a primary and secondary generator of the aircraft electrical system or the operation fault comprises a failure of at least one of a primary or secondary hydraulic motor pump of the aircraft

BRIEF DESCRIPTION OF THE DRAWINGS

Non-limiting and non-exhaustive examples are described with reference to the following figures.

DETAILED DESCRIPTION

Figure 1:
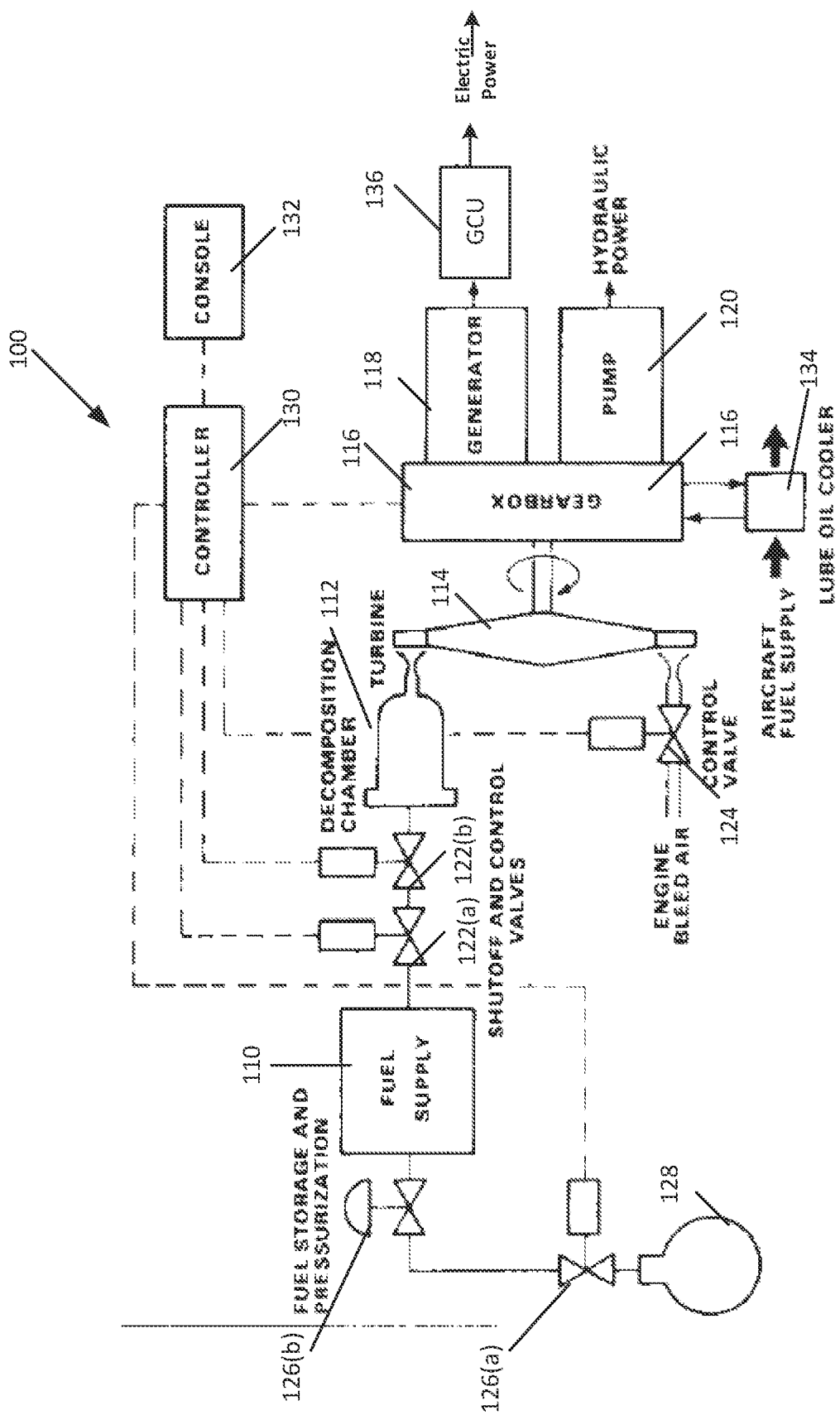
FIG. 1 is a prior art block diagram of an emergency power unit for an aircraft.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Whenever appropriate, terms used in the singular also will include the plural and vice versa. The use of "a" herein means "one or more" unless stated otherwise or where the use of "one or more" is clearly inappropriate. The use of "or" means "and/or" unless stated otherwise. The use of "comprise," "comprises," "comprising," "include," "includes," and "including" are interchangeable and not intended to be limiting. The term "such as" also is not intended to be limiting. For example, the term "including" shall mean "including, but not limited to."

An aircraft emergency power unit (EPU), according to the present disclosure, includes a battery powered subsystem that replaces toxic hydrazine fuel use. The battery of the battery powered subsystem is utilized to supply power to an aircraft electrical system in the event of a failure of the EPU turbine-powered generator. The battery of the battery powered subsystem is also utilized to supply power to an electric hydraulic motor pump in the event of a failure of the EPU turbine-powered hydraulic pump (or to augment the output of the EPU-turbine-powered hydraulic pump). The battery of the battery powered subsystem is capable of simultaneously powering the electrical system and the electric hydraulic motor pump or of powering either one of the electrical system and electric hydraulic motor pump independently based upon aircraft fault conditions. Intermittent operation of the electrical system and/or the electric hydraulic motor pump in an intermittent fashion on an as-needed basis is also possible.

In view of the description herein, it can be appreciated that the EPU of the present disclosure is capable of providing stored clean energy emergency power to an aircraft through use of a battery sub-system in contrast to a prior art design EPU that relies on hydrazine fuel and a catalyst for emergency power. The battery sub-system of the EPU of the present disclosure eliminates the toxic vapors that result from the hydrazine fuel and eliminates the hazards, time and costs associated with replacing or repairing components associated with the hydrazine fuel. Further, the EPU of the present disclosure enables the ability to selectively activate one or both of a hydraulic pump and a generator with bleed air in emergency operating conditions.

FIG. 1 is a prior art schematic of the hydrazine-based emergency power unit (EPU) 100 currently being used in certain aircraft, including the F-16 Fighting Falcon aircraft. As shown, the emergency power unit generally includes six main components including a hydrazine fuel supply 110, a decomposition chamber 112, a turbine 114, a gearbox, 116, a generator 118 and a hydraulic pump 120 (e.g., a variable speed, fixed displacement pump). The other components illustrated include fuel supply control valves 122(a), 122(b), a bleed air control valve 124, fuel storage and pressurization valves 126(a), 126(b), a nitrogen storage container 128, a controller 130, and a console 132. A lube oil cooler 134, providing lubrication to the gearbox 116 from the aircraft fuel supply, as well as a generator control unit (GCU) 136 for sensing and regulating the powered generated by the generator 118 are also illustrated.

In operation, the EPU 100 is activated responsive to pilot input via a switch on the console or responsive to sensed emergency operating conditions occurring in the aircraft. Upon receipt of a start command from the controller 128, valve 126(a) releases nitrogen from the storage container 128 and valve 126(b) regulates the nitrogen to pressure and forces the hydrazine fuel supply 110 to the decomposition chamber 112. In the decomposition chamber, the hydrazine fuel breaks down on contact with an iridium catalyst to form a high energy, hot gas, that is a mixture of hydrogen, nitrogen, ammonia and steam. The hot gas mixture expands through fixed nozzles into the axial impulse turbine 114 that provides the torque to drive the pump and generator 118. Speed reduction from the turbine speed to the desired generator 118 and pump speeds is accomplished in the gearbox 116.

When a designated or desired turbine speed is reached, the fuel supply control valves 122(a), 122(b) close under controller 130 command, which stops the flow of the hydrazine fuel to the decomposition chamber 112. As the EPU 100 slows, the controller 130 commands the fuel supply control valves 122(a), 122(b) to open, thereby, reaccelerating the turbine 114. By this method, fuel flow is adjusted to maintain essentially constant aircraft turbine speed, irrespective of any accessory load demand. Redundant speed sensors (not shown) provide the controller 130 with the data necessary to control the EPU 100.

The EPU 100 can also be powered from the aircraft engine air obtained from a bleed valve of the aircraft engine. The controller 130 is programmed for the preferential use of bleed air, when available, and to augment the bleed air with hydrazine fuel decomposition on an as-needed basis if the bleed air supply is inadequate to maintain EPU 100 speed under the applied loads. In this mode of operation the EPU 100 is started with the hydrazine fuel supply 110, as described herein, to achieve a desired start-up time, but during subsequent operation, the fuel supply control valves 122(a), 122(b), are closed and power is provided through a torque-motor driven bleed-air control valve 125. Aircraft speed information from speed sensors and valve position feedback to the controller 130, ensure operation at the design speed. Operation of the aircraft on bleed air is unlimited while operation on the hydrazine fuel supply 110 limited to approximately 10 minutes due to the limited quantity of hydrazine fuel that can be carried. Notably, activation of the turbine 114 by the decomposition of the hydrazine fuel or by bleed air results in the turbine 114 activating both the generator 118 and the hydraulic pump 120, e.g., there is no option to activate only one of either the generator 118 or the hydraulic pump 120.

Figure 2:
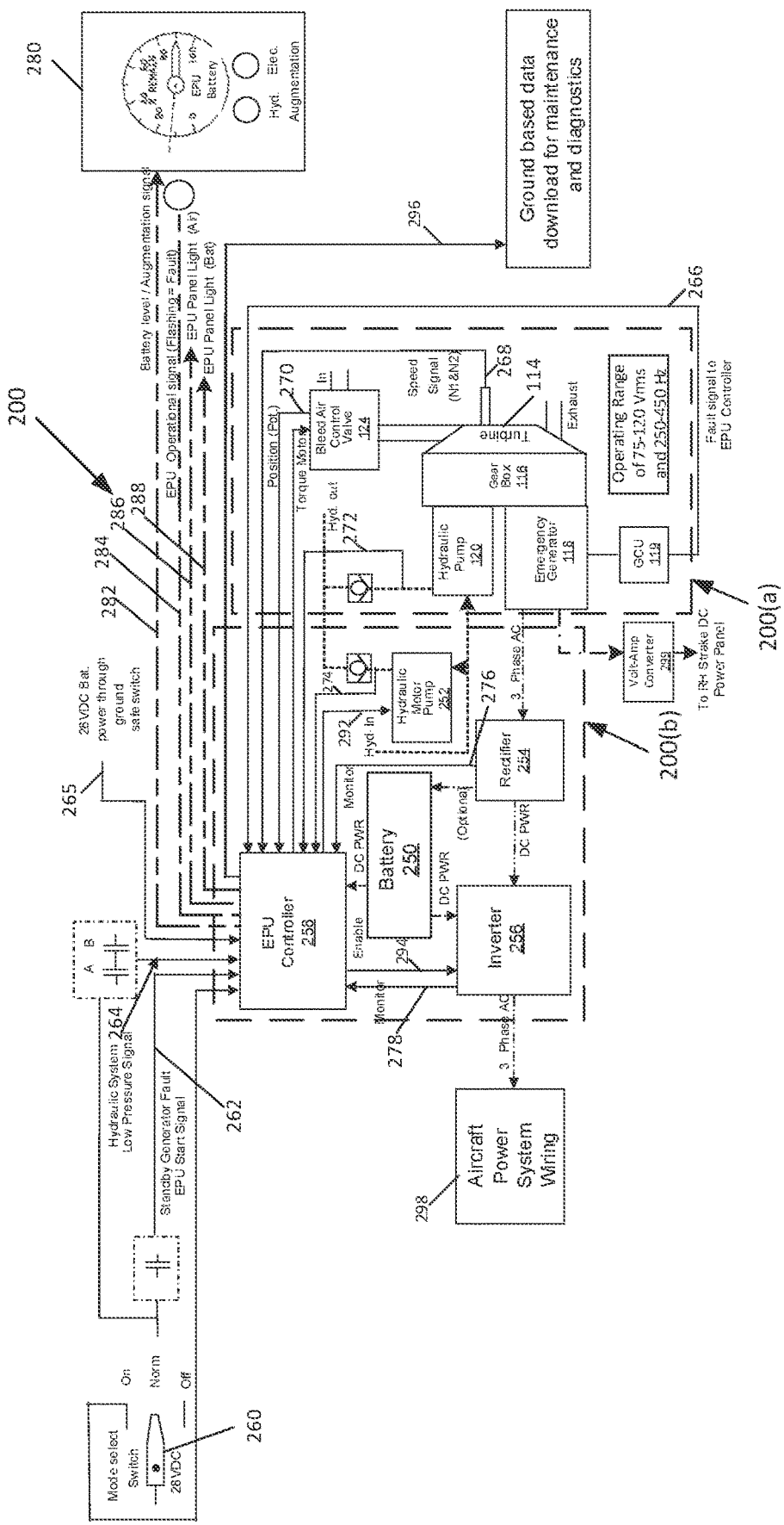
FIG. 2 is a block diagram of an aircraft emergency power unit with a battery powered subsystem according to the present disclosure.

Referring now to FIG. 2, an emergency power unit (EPU) 200 according to the present disclosure is illustrated. The EPU 200 generally includes a subsystem 200(*a*) of existing components and a battery powered subsystem 200(*b*) of new components. As with the EPU 100 of FIG. 1, the subsystem 200(*a*) of the EPU 200 includes a turbine 114, a gearbox 116, a gearbox-mounted generator 118, a gearbox-mounted hydraulic pump 120 and a bleed air control valve 124. Missing from the EPU 100 are the hydrazine fuel supply 110 and decomposition chamber 112 along with their associated control valves 122(*a*), 122(*b*), 126(*a*), 126(*b*). New to the EPU 200 within battery powered subsystem 200(*b*) is an onboard battery 250, a hydraulic motor pump 252 (e.g., a constant speed, variable flow pump or a variable speed pump) that draws its power from the onboard battery 250, a rectifier 254 and a solid state three-phase power inverter 256 that also draws its power from the onboard battery 250 and can be isolated from or connected to the aircraft mains power). Further, a new controller 258, such as an Eaton EPU System Controller, replaces the original controller 130 and provides primary control for EPU 200 operations.

Inputs to the controller 258 include a mode select switch 260 that enables a pilot to turn ON the EPU 200, turn OFF the EPU 200 or allow the EPU 200 to operate in NORMAL mode such that the EPU activates upon sensing faulty operating conditions within the aircraft. Further inputs include:

(a) a standby generator fault EPU signal 262, which indicates that both a primary generator of the aircraft has failed and a redundant secondary standby generator of the aircraft has also failed with the signal 262 produced by the secondary standby generator based on a sensed current and/or voltage at the secondary standby generator;

(b) a hydraulic system low pressure signal 264 from one or more pressure sensors indicating at least one of the primary hydraulic system, e.g., system A, or the redundant secondary hydraulic system, e.g., system B has failed;

(c) a 28 VDC battery power through ground safe switch input 265, which is generally used for a safe (lockout) signal so there is no inadvertent activation of the EPU 200 and can be used for small signal operating power within the controller 258 rather than using power from the battery 250 (the 28 VDC battery is connected the aircraft battery); and (d) a generator fault signal 266 produced by the generator 118 based on a sensed current and/or voltage that is reflective of the operating status of the generator 118 based on sensing a current and/or voltage at the generator 118.

Further inputs to the controller 258 include one or more speed signals 268 from the turbine 114, a position signal 270 representative of the position of the bleed air control valve 124, a pressure signal 272 representative of the hydraulic pressure out of the hydraulic pump 120 and a pressure signal 274 representative of the hydraulic pressure out of the hydraulic motor pump 252 as well as a signal 276 representative of the DC power level at the rectifier 254 and a signal 278 representative of the AC power level at the inverter 256.

Outputs from the controller 258 include various signals to a dashboard console 280 to provide visual status indicators. These signals include a battery level/augmentation signal 282 indicating a power level remaining in the battery 250 and whether hydraulic augmentation via hydraulic motor pump 252 and/or electrical augmentation via inverter 256 is being provided, a signal 284 to a panel light indicating an operation status of the EPU 200 as ON/OFF/NORMAL (with a flashing panel light indicating an EPU fault), a signal 286 to a panel light indicating whether bleed air is being used by the EPU 200, and a signal 288 to a panel light indicating whether the battery 250 is being used by the EPU 200 to supply power via the electrically powered hydraulic motor pump 252. Additional outputs from the controller 258 include a torque motor control signal 290 to control operation of the bleed air control valve 124, a control signal 292 to control operation of the hydraulic motor pump 252, a control signal 294 to enable operation of the inverter 256. An additional output from the controller 258 includes a communications link 296 to enable download of controller 258 data for maintenance and diagnostic analysis.

When the generator 118 is in use by the EPU 200, the generator 118 produces 3-phase AC power that is delivered to the rectifier 254. The rectifier 254 converts the AC power to DC power, e.g., 115V AC to 270V DC, which is supplied to the inverter 256 and can also be optionally used to recharge the battery 250. The inverter 256 converts the DC power to 3-phase AC power, e.g., 270V DC to 115V AC, and supplies the AC power to the aircraft power system wiring 298. The generator 118 additionally supplies power to a volt-amp converter 299, e.g. a 500 VA converter that is specific to an F-16 aircraft, that supplies power to an RH strake DC power panel.

Figure 3:
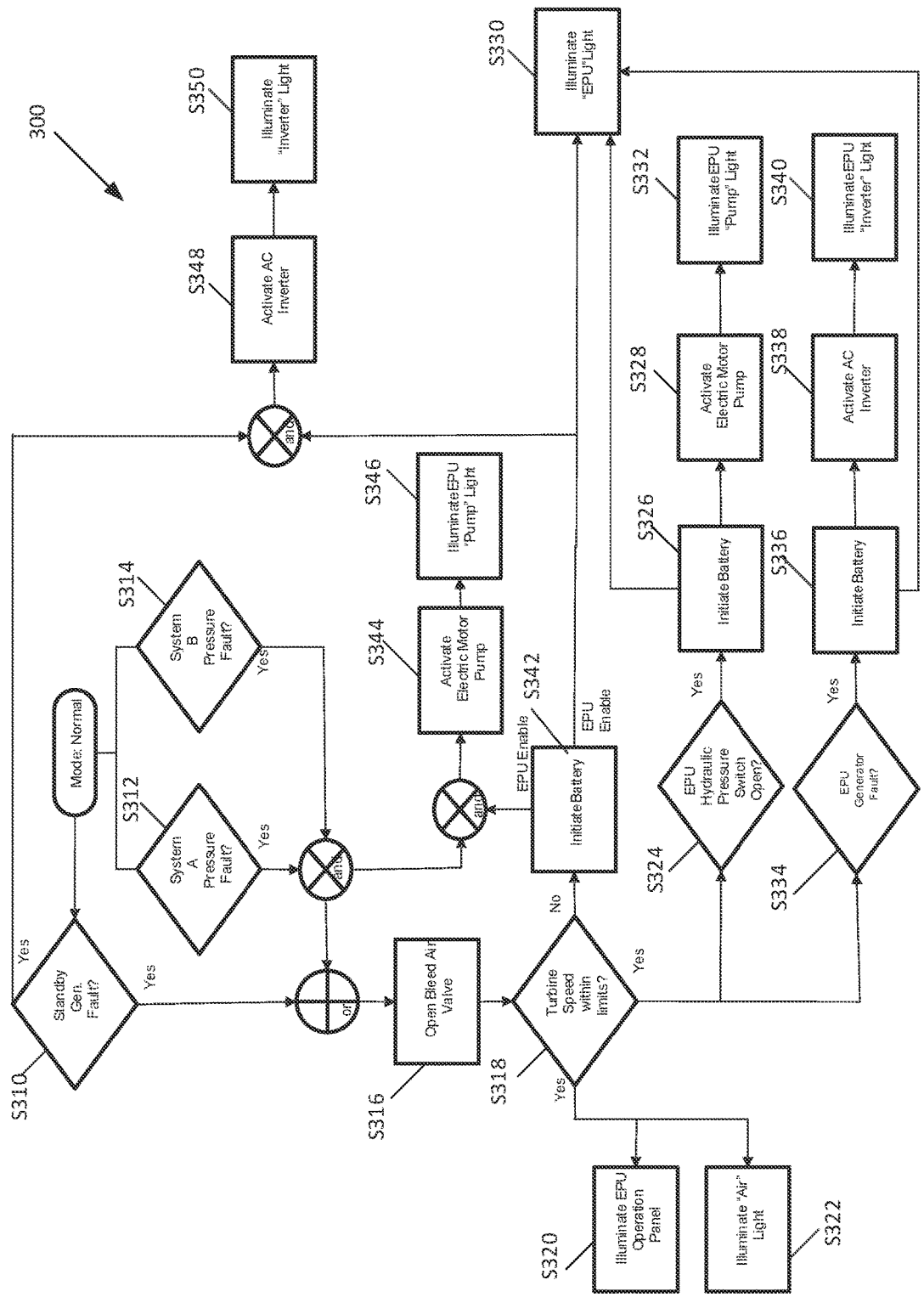
FIG. 3 is a flowchart illustrating a NORMAL mode of operation of the aircraft emergency power unit with a battery powered subsystem.

FIG. 3 is a flowchart illustrating a method of operation 300 of the EPU 200 when a fault in normal operation of an aircraft occurs. As shown, when operating in normal mode and a standby generator fault is detected by the controller 258, S310: YES, or both a system A pressure fault, S312: YES, and a system B pressure fault, S314: YES, is detected by the controller 258, the bleed air valve 124 is opened, S316, causing activation of the turbine 114 and resultant activation of the hydraulic pump 120 and generator 118.

If the turbine speed is at a desired operating level (e.g., in an operational mode), S318: YES, a panel light is activated by the controller 258 to indicate that the EPU 200 is operational, S320, and a panel light is activated by the controller 258 to indicate that bleed air is being used to power the aircraft, S322. Further, if the turbine speed is at a desired operating level, S318: YES, it is then determined if the EPU hydraulic pressure switch is open, S324 (e.g., it is determined if the hydraulic pump 120 is operating at sufficient operational pressure).

If the pressure switch is not open (e.g., the hydraulic pump 120 is operating at sufficient pressure, e.g., in an operational mode), S320: NO, no action is taken. If the pressure switch is open (e.g., the hydraulic pump 120 is not providing sufficient power to power the aircraft, e.g., in a fault mode), S324: YES, then operation of the battery 250 is initiated, S326, the electric hydraulic motor pump 252 is activated, S328, the panel light indicating the EPU 200 is active is lit, S330, and the panel light indicating the hydraulic motor pump 252 is active is lit, S332. Additionally, if the turbine speed is at a desired operating level, S318: YES, it is determined whether there is an EPU generator fault, S334 (e.g., it is determined if the generator 118 is operational to power the aircraft electrical system).

If there is no EPU generator fault (e.g., the generator 118 is operational, e.g., in an operational mode), S334: NO, no action is taken. If there is an EPU generator fault (e.g., the generator 118 has failed, e.g., in a fault mode), S334: YES, then: (a) operation of the battery 250 is initiated to deliver sufficient DC power to the inverter 256 to power the aircraft electrical system, S336; (b) operation of the AC inverter 256 is activated to receive DC power from the battery 250, S338; (c) the panel light indicating the EPU 200 is active is lit, S330; and (d) the panel light indicating the inverter 256 is active is lit, S340 (e.g., the Elec. Augmentation light on the dashboard console 280 is lit).

If the turbine speed is not at a desired operating level (e.g., in an fault mode), S318: NO, the operation of the battery 250 is initiated, S342, and the panel light indicating the EPU 200 is active is lit, S330. Further, in the instance that operation of the battery has been initiated under step S342 and both hydraulic system A and hydraulic system B have indicated a pressure fault, S312: YES and S314: YES, the electric hydraulic motor pump 252 is activated, S344, and the panel light indicating the electric hydraulic motor pump 252 is active is lit, S346. Note that the electrical hydraulic motor pump 252 will come online and be operational in as little as 0.25 seconds to fill the gap in time that it takes the turbine 114 to come up to speed using bleed air, which is around 3 seconds. Once the turbine 114 is up to speed with bleed air, the controller 258 turns off the electrical hydraulic motor pump 252 saving battery power. The electric hydraulic motor pump 252 can be turned on at any time, as necessary, to augment air bleed turbine speed.

Further, in the instance that operation of the battery 250 has been initiated under step S342 and a standby generator fault is detected (e.g., indicating the primary and secondary generators of the aircraft have failed) by the controller 258, S310: YES, operation of the AC inverter 256 is activated to receive power DC power from the battery 250, S348, and DC power from the battery 250 is supplied to the inverter 256 to power the aircraft electrical system; the panel light indicating the inverter 256 is active is also lit, S350. As such, it can be seen that when the EPU 200 is operating in a battery mode, the battery 250 can be used to power only the aircraft electrical system via the inverter 256, power only the aircraft hydraulic system via the electrical hydraulic motor pump 252 or power both the aircraft electrical and hydraulic systems as needed. The prior art EPU 100 does not allow for powering one or the other of the electrical and hydraulic systems but rather both systems are always powered with the generator 118 and hydraulic pump 120.

Figure 4:
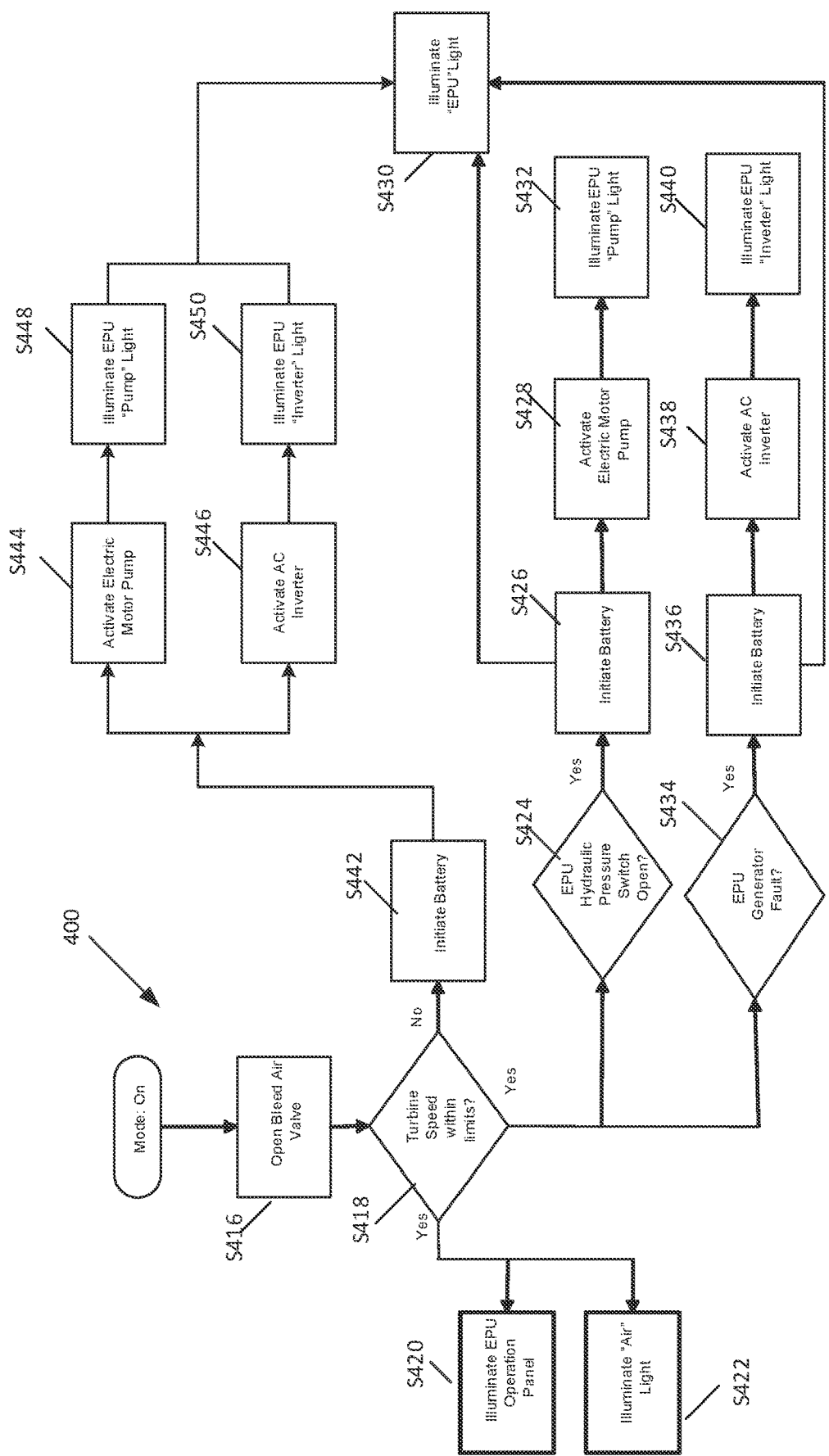
FIG. 4 is a flowchart illustrating an ON mode of operation of the aircraft emergency power unit with a battery powered subsystem.

FIG. 4 is a flowchart illustrating a method of operation 400 of the EPU 200 when the EPU 200 has been turned ON by the aircraft pilot. As shown, the first step in both the NORMAL mode of operation and the ON mode of operation, is the opening of the bleed air valve 124, S416, causing activation of the turbine 114 and resultant activation of the hydraulic pump 120 and generator 118.

If the turbine speed is at a desired operating level (e.g., in an operational mode), S418: YES, a panel light is activated by the controller 258 to indicate that the EPU 200 is operational, S420, and a panel light is activated by the controller 258 to indicate that bleed air is being used to power the aircraft, S422. Further, if the turbine speed is at a desired operating level, S418: YES, it is then determined if the EPU hydraulic pressure switch is open, S424 (e.g., it is determined if the hydraulic pump 120 is operating at sufficient operational pressure).

If the pressure switch is not open (e.g., the hydraulic pump 120 is operating at sufficient pressure, e.g., in an operational mode), S420: NO, no action is taken. If the pressure switch is open (e.g., the hydraulic pump 120 is not providing sufficient power to power the aircraft, e.g., in a fault mode), S424: YES, then operation of the battery 250 is initiated, S326, the electric hydraulic motor pump 252 is activated, S428, the panel light indicating the EPU 200 is active is lit, S430, and the panel light indicating the hydraulic motor pump 252 is active is lit, S432. Additionally, if the turbine speed is at a desired operating level, S418: YES, it is determined whether there is an EPU generator fault, S434 (e.g., it is determined if the generator 118 is operational to power the aircraft electrical system).

If there is no EPU generator fault (e.g., the generator 118 is operational, e.g., in an operational mode), S434: NO, no action is taken. If there is an EPU generator fault (e.g., the generator 118 has failed, e.g., in a fault mode), S434: YES, then: (a) operation of the battery 250 is initiated to deliver sufficient DC power to the inverter 256 to power the aircraft electrical system, S436; (b) operation of the AC inverter 256 is activated to receive DC power from the battery 250, S338; (c) the panel light indicating the EPU 200 is active is lit, S430; and (d) the panel light indicating the inverter 256 is active is lit, S440.

If the turbine speed is not at a desired operating level (e.g., in fault mode), S418: NO, the battery 250 is initiated, S442, and the hydraulic motor pump 252 is activated S444 as is the AC inverter, S446. Further, the panel light indicating the hydraulic motor pump 252 is active is lit, S448, the panel light indicating the inverter 256 is active is lit, S440, and the panel light indicating the EPU 200 is active is lit, S430.

While the NORMAL and ON modes of operation are described herein with reference to FIGS. 3 and 4, it should also be noted that the aircraft pilot also has the option placing the EPU 200 in an OFF mode, a mode that is suitable for ground maintenance of the aircraft.

As can be appreciated by the description of the EPU 200 herein, the battery powered subsystem 200(*b*) of the EPU 200 eliminates the components and controls associated with the use of the hydrazine fuel in the prior art EPU 100. Further, the control of the bleed air control valve 124 is integrated into the new EPU controller 258 eliminating the EPU controller 130 as a line replaceable unit (LRU). Further still, the EPU 200 allows for hydraulic or electric power selection during operation which extends the overall run time of the EPU 200; the prior art EPU 100 has a run time of approximately 10 minutes while the EPU 200 provides a run time of approximately 11 minutes if both the hydraulic pump 252 and inverter 256 are operational, and greater than 20 minutes if only one of the hydraulic pump 252 or inverter 25 is operational. It should be appreciated that the noted run times are by way of example only and that other run times may be higher or lower than those provided herein.

The EPU 200 also provides an inverter, e.g., inverter 256, that is in-line with the generator 118 meaning additional contactors or power bus modifications are not required and integration of the electrical subsystem 200(*b*) is streamlined. The in-line inverter 256 provides conditioned generator power into the aircraft providing essentially seamless electrical power transition and a reduction of power induced faults that occur with the prior art EPU 100. The design of the battery powered subsystem 200(*b*) of the EPU is also scalable in design to accommodate the electric system and hydraulic system requirements of different types of aircraft.

It should be noted that, while flowcharts illustrated and described herein denote specific steps in a specific order, a greater or fewer number of steps and/or a different sequence of steps or simultaneous occurrence of steps is possible as can be appreciated by one skilled in the art.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed:

1. An aircraft emergency power unit (EPU), comprising:
a bleed-air powered turbine;
a hydraulic pump powered by the turbine, the hydraulic pump having an operational mode during which hydraulic power is supplied to a hydraulic system of an aircraft at a level sufficient to support hydraulic operation of the aircraft and a fault mode during which the hydraulic pump is supplying insufficient power to the hydraulic system of the aircraft;
a generator powered by the turbine, the generator having an operational mode during which electrical power is supplied to an electrical system of an aircraft at a level sufficient to support electrical operation of the aircraft and a fault mode during which the generator is supplying insufficient electrical power to power the electrical system of the aircraft;
a battery;
a hydraulic motor pump powered by the battery, the hydraulic motor pump activated to supply hydraulic power to the aircraft hydraulic system responsive to an occurrence of the fault mode of the hydraulic pump; and
an inverter, the inverter activated to receive DC power from the battery and supply electrical power to the electrical system of the aircraft responsive to the occurrence of the fault mode of the generator.

2. The aircraft EPU of claim 1, wherein activation of the hydraulic motor pump is independent of the activation of the inverter.

3. The aircraft EPU of claim 2, wherein the fault mode of the hydraulic pump is intermittent, and the activation of the hydraulic motor pump is correspondingly intermittent.

4. The aircraft EPU of claim 2, wherein the fault mode of the generator is intermittent, and the activation of the inverter is correspondingly intermittent.

5. The aircraft EPU of claim 2, wherein the hydraulic motor pump and the inverter are active simultaneously.

6. The aircraft EPU of claim 1, wherein the activated hydraulic motor pump augments the hydraulic power supplied by the hydraulic pump.

7. The aircraft EPU of claim 1, wherein the activated hydraulic motor pump supplies all hydraulic power to the hydraulic system of the aircraft.

8. An aircraft emergency power unit (EPU), comprising:
a bleed air valve;
a turbine, the turbine powered by bleed air supplied through the bleed air valve, the powered turbine having a speed;
a hydraulic pump powered by the turbine, the hydraulic pump having an operational mode during which hydraulic power is supplied to a hydraulic system of an aircraft at a level sufficient to support hydraulic operation of the aircraft and a fault mode during which the hydraulic pump is supplying insufficient power to the hydraulic system of the aircraft;
a generator powered by the turbine, the generator having an operational mode during which electrical power is supplied to an electrical system of an aircraft at a level sufficient to support electrical operation of the aircraft and a fault mode during which the generator is supplying insufficient electrical power to power the electrical system of the aircraft;
a battery;
a hydraulic motor pump powered by the battery, the hydraulic motor pump activated to supply hydraulic power to the aircraft hydraulic system responsive to one or both of: (a) an occurrence of the fault mode of the hydraulic pump; and (b) an occurrence of the speed of the turbine at a level other than a desired operating speed; and
an inverter, the inverter activated to receive DC power from the battery and supply electrical power to the electrical system of the aircraft responsive to the occurrence of the fault mode of the generator.

9. The aircraft EPU of claim 8, wherein activation of the hydraulic motor pump is independent of the activation of the inverter.

10. The aircraft EPU of claim 9, wherein the fault mode of the hydraulic pump is intermittent, and the activation of the hydraulic motor pump is correspondingly intermittent.

11. The aircraft EPU of claim 9, wherein the fault mode of the generator is intermittent, and the activation of the inverter is correspondingly intermittent.

12. The aircraft EPU of claim 9, wherein the hydraulic motor pump and the inverter are active simultaneously.

13. The aircraft EPU of claim 8, wherein the activated hydraulic motor pump augments the hydraulic power supplied by the hydraulic pump.

14. The aircraft EPU of claim 8, wherein the activated hydraulic motor pump supplies all hydraulic power to the hydraulic system of the aircraft.

15. The aircraft EPU of claim 8, wherein the bleed air valve is opened to supply bleed air responsive to both a primary generator and a redundant secondary generator of the aircraft failing.

16. The aircraft EPU of claim 8, wherein the bleed air valve is opened to supply bleed air responsive to a user-input.

17. A method of operating an aircraft emergency power unit (EPU), the method comprising:
opening a bleed air valve to supply bleed air to a turbine, the turbine powering a hydraulic pump to supply hydraulic power to an aircraft hydraulic system
determining that a speed of the turbine is not at a desired operating level;
based on the speed of the turbine not being at the desired operating level, activating a hydraulic motor pump with a battery to supply hydraulic power not being supplied by the hydraulic pump;
based on the speed of the turbine being at the desired operating level, deactivating the battery powered hydraulic motor pump.

18. The method of claim 17, wherein the turbine additionally powers a generator to supply electrical power to an aircraft electrical system and the method further comprising:
determining that the generator is not providing sufficient electrical power to an electrical system;
activating an inverter to receive DC power from the battery;
supplying electrical power to the aircraft electrical system via the inverter.

19. The method of claim 18, wherein opening the bleed air valve occurs responsive to a user-input or to an operational fault of the aircraft.

20. The method of claim 19, wherein the operational fault comprises a failure of a primary and secondary generator of the aircraft electrical system or wherein the operation fault comprises a failure of at least one of a primary or secondary hydraulic motor pump of the aircraft.

* * * * *